US009503945B2

(12) United States Patent
Weber et al.

(10) Patent No.: US 9,503,945 B2
(45) Date of Patent: Nov. 22, 2016

(54) APPARATUSES, METHODS AND COMPUTER PROGRAMS FOR A BASE STATION TRANSCEIVER AND A RELAY STATION TRANSCEIVER

(71) Applicant: Alcatel Lucent, Boulogne Billancourt (FR)

(72) Inventors: Andreas Weber, Stuttgart (DE); Siegfried Klein, Stuttart (DE); Uwe Doetsch, Stuttgart (DE); Hajo Bakker, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/396,304
(22) PCT Filed: Apr. 4, 2013
(86) PCT No.: PCT/EP2013/057103
§ 371 (c)(1),
(2) Date: Oct. 22, 2014
(87) PCT Pub. No.: WO2013/160078
PCT Pub. Date: Oct. 31, 2013

(65) Prior Publication Data
US 2015/0087314 A1   Mar. 26, 2015

(30) Foreign Application Priority Data
Apr. 23, 2012 (EP) .................................. 12305467

(51) Int. Cl.
| | |
|---|---|
| *H04W 36/00* | (2009.01) |
| *H04W 16/26* | (2009.01) |
| *H04W 36/04* | (2009.01) |
| *H04W 16/24* | (2009.01) |
| *H04W 84/04* | (2009.01) |
| *H04W 84/00* | (2009.01) |
| *H04W 72/12* | (2009.01) |
| *H04W 88/04* | (2009.01) |

(52) U.S. Cl.
CPC ......... *H04W 36/0072* (2013.01); *H04W 16/24* (2013.01); *H04W 16/26* (2013.01); *H04W 36/04* (2013.01); *H04W 72/12* (2013.01); *H04W 84/005* (2013.01); *H04W 84/047* (2013.01); *H04W 88/04* (2013.01)

(58) Field of Classification Search
CPC .......... H04W 36/0072; H04W 16/24; H04W 16/26; H04W 36/04; H04W 88/04; H04W 72/12; H04W 84/005; H04W 84/047
USPC ......................................................... 455/437
See application file for complete search history.

(56) References Cited

U.S. PATENT DOCUMENTS

2011/0275359 A1* 11/2011 Sebire .................... H04L 5/001
455/422.1
2011/0310852 A1* 12/2011 Dimou .................. H04W 36/08
370/332

(Continued)

OTHER PUBLICATIONS

3GPP TR 36.814, 3rd Generation Partnership Project; Technical Specification Group Radio Access Network; Evolved Universal Terrestrial Radio Access (E-UTRA); Further Advancements for E-UTRA physical layer aspects, 2010.*
"$3^{rd}$ Generation Partnership Project; Technical Specification Group Radio Access Network; Evolved Universal Terrestrial Radio Access (E-UTRA); Further advancements for E-UTRA physical layer aspects (Release 9)," 3GPP TR 36 814 V9.0.0, pp. 1-104, XP050402153, (Mar. 2010).

(Continued)

*Primary Examiner* — Tanmay Shah
(74) *Attorney, Agent, or Firm* — Fay Sharpe, LLP (57) ABSTRACT

Embodiments provide methods, computer programs and apparatuses 10, 30 for a base station transceiver 100 and a relay station transceiver 300 in a mobile communication network 400, which comprises the base station transceiver 100, a mobile transceiver 200 being associated with the base station transceiver 100 and a relay transceiver 300 being associated with the base station transceiver 100. The base station transceiver apparatus comprises a receiver 12 for receiving information on a handover request from the mobile transceiver 200, the information on the handover request indicating that the mobile transceiver 200 is in a situation in which a reception quality of the signals of the relay transceiver 300 would allow a re-association of the mobile transceiver 200 to the relay transceiver 300. The base station transceiver apparatus 10 further comprises a scheduler 14 for scheduling, subsequent to the reception of the handover request, the mobile transceiver 200 for transmission from the base station transceiver 100 to the mobile transceiver 200 on a radio resource on which transmission of the relay transceiver 300 is suspended. The apparatus 30 for the relay transceiver comprises a reception unit 32 for receiving information on a resource assignment from the base station transceiver 100 and a scheduling unit 34 for scheduling the mobile transceiver 220 for transmission or reception on a radio resource which is indicated in the information on the resource assignment.

12 Claims, 4 Drawing Sheets

(56) References Cited

U.S. PATENT DOCUMENTS

| | | | | |
|---|---|---|---|---|
| 2012/0052814 A1* | 3/2012 | Gerber | H04W 72/048 | 455/67.11 |
| 2012/0151035 A1* | 6/2012 | Puthenpura | H04W 24/06 | 709/224 |
| 2013/0017820 A1* | 1/2013 | Drazynski | H04W 48/16 | 455/422.1 |
| 2013/0242744 A1* | 9/2013 | Wigren | H04W 24/02 | 370/236 |

OTHER PUBLICATIONS

Motorola, "Relay Performance Evaluation with Backhaul Subframe Dynamic Partitioning and Enhancement Techniques—System Simulations," $3^{rd}$ Generation Partnership Project (3GPP), 3GPP TSG RAN WG1 Meeting #60bis, R1-102131, pp. 1-20, XP050419439, Beijing, China, Apr. 12-16, 2010.

International Search Report for PCT/EP2013/057103 dated May 6, 2013.

* cited by examiner

APPARATUSES, METHODS AND COMPUTER PROGRAMS FOR A BASE STATION TRANSCEIVER AND A RELAY STATION TRANSCEIVER

Embodiments of the present invention relate to mobile communications, more particularly to mobile communication networks using relaying.

BACKGROUND

Demands for higher data rates for mobile services are steadily increasing. At the same time, modern mobile communication systems as 3rd Generation systems (3G) and 4th Generation systems (4G) provide enhanced technologies, which enable higher spectral efficiencies and allow for higher data rates and cell capacities. As operators are seeking to extend the coverage of their networks, relaying concepts become more and more sophisticated.

In the 3rd Generation Partnership Project (3GPP) as international standardization body, relay architectures for Evolved-Universal Mobile Telecommunication System (UMTS) Terrestrial Radio Access (E-UTRA) have been discussed and results can be found, for example, in Technical Recommendation (TR) 36.806 or TR 36.814. These new architectures are likely to be established in the future for Long Term Evolution—Advanced (LTE-A) networks.

In relaying architectures a relay station transceiver may extend the coverage of a base station transceiver. Basic concepts use a relay station transceiver, which receives signals from a base station transceiver and forwards them to mobile transceivers, and vice versa, for example, as a repeater in an amplify-and-forward fashion. Other relaying concepts may receive the signals from the base station transceivers at the relay station and demodulate or decode them before they are re-encoded or re-modulated and forwarded to the mobile transceiver, and vice versa. The radio signals from the base station transceiver are received, amplified and transmitted to the mobile transceiver, from the mobile station transceiver, respectively. In such a scenario the relay station may not even be identified as such by a mobile transceiver. In other concepts, the relay station transceiver may correspond to a base station transceiver, which is connected to another base station transceiver, the so-called donor base station transceiver, via a radio interface and provides radio services as a base station to the mobile transceiver station. The base station transceiver then forwards data for transmission to the relay station transceiver through backhaul signaling, which can generally be implemented in a wireless manner.

SUMMARY

Embodiments are based on the finding that conventional relay nodes, such as the relay node defined by 3GPP for e.g. coverage extension, are stationary and may not efficiently support any upcoming car communication. It is a further finding that subscribers of mobile networks are frequently sharing a vehicle, such as a car, a train, a bus, etc. when traveling together. Moreover, embodiments are based on the finding that mobile users traveling in the same car can be registered at a mobile relay base station. Towards an umbrella radio network, this mobile relay may have the attributes of a mobile communication device and towards the mobile communications devices of the subscribers in the car it may act as base station. The mobile relay may be comprised in a separate device installed in the vehicle or it may correspond to one of the mobile transceivers riding along with the vehicle which assumes the role of the mobile relay.

According to a further finding the mobile relay may work as Closed Subscriber Group (CSG), i.e. not every mobile transceiver is allowed to handover to or associate with the mobile relay. If a mobile transceiver being in the coverage area of the mobile relay is denied to handover to the mobile relay, a severe interference condition may result, in particular in a single carrier case. In this case, the mobile relay may create interference to a macro mobile located closely to a car, while the macro mobile is not allowed to perform a handover to the mobile relay. On the other hand, the macro mobile may transmit with a very high power in the UpLink (UL) and may interfere with the UL transmissions inside the car's mobile network. Furthermore, if two mobile relays are located closely to each other, the mobile DownLink (DL) and UL transmissions in the car (in-car transmissions) may interfere with the in-car transmissions of the other mobile relay.

Moreover, if a single carrier is used for access between the mobile transceivers and the base station transceivers, for accessing the relay station transceivers and for backhauling, a relay station transceiver receives backhaul traffic from the base station transceiver and transmits data to associated mobile terminals or transceivers on the same frequency. Because the relay station transceiver cannot receive and transmit on the same frequency at the same time, a Time Division Multiplexing (TDM) scheme can be applied. The available sub-frames or radio frames are separated in sub-frames for access, or A-sub-frames, and sub-frames for backhauling, or B-sub-frames, on said same frequency. In an A-sub-frame the relay station transceiver and the donor base station transceiver transmit data to their associated mobile terminals.

It is a further finding that a relay transceiver may not receive any data from its donor base station transceiver in A-sub-frames, while transmitting data on the same frequency in a B-sub-frame. In a B-sub-frame the relay station transceiver may receive backhaul traffic from its donor base station transceiver but does not transmit any data to mobile terminals or transceivers on the same frequency in an A-sub-frame. The donor base station transceiver can use remaining resources in B-sub-frames to transmit data to associated mobile terminals or transceivers.

Embodiments are based on the finding that interference coordination can be beneficial for mobile relays. Without interference coordination, macro mobiles located close to a mobile relay may experience degraded channel quality and call drops, UL in-car connections can be interfered by macro mobiles, and transmissions within a mobile relay may have low throughput in case of two mobile relays, which are closely located.

Embodiments provide an apparatus for a base station transceiver in a mobile communication network, i.e. embodiments may provide said apparatus to be operated by or included in a base station transceiver. Embodiments also provide a base station transceiver comprising such a base station transceiver apparatus. In the following, said apparatus will also be referred to as base station transceiver apparatus. Moreover, the terms mobile communication network and mobile communication system will be used synonymously. The mobile communication system may, for example, correspond to one of the 3GPP-standardized mobile communication networks, as e.g. Long Term Evolution (LTE), an LTE-Advanced (LTE-A), a Universal Mobile Telecommunication System (UMTS) or a UMTS Terrestrial Radio Access network (UTRAN), an Evolved-UTRAN (E-UTRAN), a Global System for Mobile Communication (GSM) or Enhanced Data Rates for GSM Evolution (EDGE) network, a GSM/EDGE Radio Access Network (GERAN), generally an Orthogonal Frequency Division Multiple Access (OFDMA) network, etc., or mobile communication networks with different standards, e.g. Worldwide Interoperability for Microwave Access (WI-MAX).

The mobile communication network comprises the base station transceiver, a mobile transceiver, which is associated with the base station transceiver, and a relay transceiver, which is also associated with the base station transceiver, i.e. the mobile transceiver and the relay transceiver are camped on the base station transceiver. The components of the mobile communication network may be compliant to one of the above mobile communication networks. E.g. the base station transceiver may correspond to a NodeB (NB) or an Evolved-NB. In other words, the mobile transceiver and the relay transceiver are registered with the base station transceiver and data exchange between the mobile transceiver and the relay transceiver and the mobile communication network is carried out through the base station transceiver, i.e. the base station transceiver may also be referred to as the serving cell of the mobile transceiver and the relay transceiver.

Moreover, as it will be detailed subsequently, the mobile communication network may further comprise a further mobile transceiver, which is associated with the relay transceiver, i.e. the further mobile transceiver is camped on the relay station transceiver. In other words, while a first mobile transceiver is associated to the base station transceiver, the second mobile transceiver is registered with the relay station transceiver and data exchange between the further mobile transceiver and the mobile communication network is carried out through the relay transceiver and the base station transceiver, i.e. the relay transceiver may also be referred to as the serving cell of the further mobile transceiver.

In embodiments, the mobile communication system may comprise mobile transceivers and base station transceivers. A mobile transceiver may correspond to a smartphone, a cell phone, user equipment, a laptop, a notebook, a personal computer, a Personal Digital Assistant (PDA), a Universal Serial Bus (USB)-stick, a car, etc. A mobile transceiver may also be referred to as User Equipment (UE) in line with the 3GPP terminology. A base station transceiver can be located in the fixed or stationary part of the network or system. A base station transceiver may correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a BTS, an access point, a remote radio head, a transmission point etc., which may be further subdivided in a remote unit and a central unit. As has already been mentioned above, a relay station may appear as a base station transceiver towards mobile transceivers, which are associated with the relay transceiver. The relay transceiver may appear as a mobile transceiver towards its donor base station transceiver.

The mobile transceiver can be associated with the base station transceiver or cell. The term cell refers to a coverage area of radio services provided by a base station transceiver, e.g. a NodeB, an eNodeB, a remote radio head, a transmission point, etc. A base station transceiver may operate multiple cells on one or more frequency layers, in some embodiments a cell may correspond to a sector. For example, sectors can be achieved using sector antennas, which provide a characteristic for covering an angular section around a remote unit or base station transceiver. In some embodiments, a base station transceiver may, for example, operate three or six cells covering sectors of 120° (in case of three cells), 60° (in case of six cells) respectively. A base station transceiver may operate multiple sectorized antennas.

The base station transceiver apparatus comprises a receiver for receiving information on a handover request from the mobile transceiver. The receiver may correspond to any means for receiving. For example, the receiver corresponds to a receiver compliant to one of the above communication systems. The information on the handover request indicates that the mobile transceiver is in a situation in which a reception quality of the signals of the relay transceiver would allow a re-association of the mobile transceiver to the relay transceiver. That is to say, the mobile transceiver provides information to the base station transceiver it is associated with, when the signals received from the relay station at the mobile transceiver would enable a handover of the mobile transceiver to the relay transceiver. The base station transceiver apparatus further comprises a scheduler for scheduling, subsequent to the reception of the handover request, the mobile transceiver for transmission from the base station transceiver to the mobile transceiver on a radio resource on which transmission of the relay transceiver is suspended. The scheduler may correspond to any means for scheduling, such as a controller, a micro-processor, a processor etc.

The base station transceiver may transmit data to the mobile transceiver using one or more radio resources from a set of radio resources. The set of radio resources may comprise any radio resources, e.g. time resources, frequency resources, code resources, spatial resources, etc. In other words, the base station transceiver may use time frames or radio frames, frequency carriers or sub-carriers, certain codes as e.g. scrambling codes, certain spatial configurations as beamforming vectors or precoding vectors, etc. to transmit data to the relay station for the relay station to relay said data to the second mobile, i.e. a mobile transceiver associated to the relay station.

As the base station transceiver knows on which radio resources the relay station transmits and receives, e.g. the base station transceiver can identify A-frames and B-frames, it can schedule the mobile transceiver such that interference is avoided. The interference condition can be determined by the information on the handover request from the mobile transceiver. Such information can correspond to an according measurement report from the mobile transceiver, which can be configured so to occur, when reference signals, such as pilot signals, sent out by the relay station fulfill respective quality criteria at the mobile transceiver. In other words, the base station transceiver apparatus may use a radio resource to schedule another mobile transceiver on which transmission of the relay transceiver is not suspended, when the other mobile transceiver has not provided information on a handover request.

In embodiments the base station transceiver further comprises a transmitter for transmitting information on a denial of the handover request to the mobile transceiver as response to the information on the handover request. The transmitter may correspond to any means for transmitting. For example, the transmitter may be compliant to a transmitter of any of the above communication systems. Moreover, the scheduler can be operable to schedule the mobile transceiver for transmission from the mobile transceiver to the base station transceiver on a radio resource on which reception of the relay transceiver is suspended. In other words, the base station transceiver apparatus may use a radio resource for UL transmission on which UL transmission of mobile transceivers associated to the relay transceiver are suspended.

Embodiments may therewith reduce or avoid interference to/from mobile relays. For example, the interference between macro and in-car connections may be reduced or avoided by time based interference coordination, e.g. by exploiting the fact that a mobile relay in a single carrier system may never receive and transmit at the same time on relay to mobile and relay to donor cell links, in order to avoid self-reception of transmitted signals.

The in-car transmission and reception gaps can be used for macro to mobile transmissions and receptions, respectively. In other words the base station transceiver apparatus can be operable to transmit signals to the relay transceiver using a time resource, which is different from a time resource used to receive signals from the relay station. The scheduler may be operable to schedule, subsequent to the reception and/or rejection of the handover request, the mobile transceiver for transmission from the base station transceiver to the mobile transceiver on a time resource used to also transmit signals to the relay station. The base station transceiver apparatus may then exploit the fact that a time resource, which is used by the relay station to receive signals from the base station transceiver, is not used by the relay station to transmit signals to mobile transceivers associated with the relay station.

The scheduler can be operable to schedule, subsequent to the reception and/or rejection of the handover request, the mobile transceiver for transmission from the mobile transceiver to the base station transceiver on a time resource used to receive signals from the relay station. The base station transceiver apparatus may then exploit the fact that a time resource, which is used by the relay station to transmit signals to the base station transceiver, is not used by the relay station to receive signals from mobile transceivers associated with the relay station.

In embodiments the relay station can be mobile and it can be installed in a vehicle, such as a car, a bus, a train, etc. In some embodiments there is at least one other mobile transceiver moving with the vehicle and associated with the relay station. In other words, embodiments may refer to a scenario with mobile relays.

In further embodiments the receiver can be operable to receive information on a handover request from another mobile transceiver, which is associated to the relay transceiver. The receiver can be operable to determine whether the information on the handover request comprises an indication that the other mobile transceiver is in a situation in which a reception quality of the signals of another relay transceiver would allow a re-association of the other mobile transceiver to the other relay transceiver. The transmitter may then transmit information on a resource assignment to the relay transceiver and it may transmit information on a resource assignment to the other relay transceiver such that the relay transceiver and the other relay transceiver use different radio resources for communicating with mobile transceivers associated to the relay transceiver and the other relay transceiver.

In other words, the mutual interference between in-car connections of two different mobile relays may be avoided in embodiments by recognizing the interference situation, i.e. by recognizing that two mobile relays are temporarily closely located, and by, e.g., splitting the bandwidth available for in-car connections into two disjunctive parts. The information on the resource assignments can be such that a bandwidth is split in a first disjunctive part, which is assigned to the relay transceiver and a second disjunctive part, which is assigned to the other relay transceiver. The information on the resource assignments can be such that a plurality of radio resources is subdivided in two disjunctive groups of combinations of time and frequency resources, where one group is assigned to the relay transceiver and another group is assigned to the other relay transceiver. In other words, different radio resources in terms of time resources, frequency resources or a combination thereof may be assigned to mobile relay stations, which were determined to be in an interfering situation. Such situation may be determined at the donor base station transceiver by receiving information on a handover request from a mobile transceiver associated to a mobile relay transceiver and indicating a potential handover to another mobile relay transceiver.

Embodiments may further provide an apparatus for the relay transceiver in the mobile communication network, i.e. embodiments may provide said apparatus to be operated by or included in a relay transceiver. Embodiments may also provide a relay transceiver comprising such a relay transceiver apparatus. In the following, said apparatus will also be referred to as relay transceiver apparatus. The mobile communication network comprises the base station transceiver, the mobile transceiver, which is associated with the relay transceiver and the relay transceiver, which is associated with the base station transceiver. The relay transceiver apparatus comprises a reception unit for receiving information on a resource assignment from the base station transceiver and a scheduling unit for scheduling the mobile transceiver for transmission or reception on a radio resource which is indicated in the information on the resource assignment. The reception unit may correspond to any means for receiving and it may correspond to a receiver compliant to one of the above communication systems. The scheduling unit may correspond to any means for scheduling, e.g. a processor, a controller, etc. In other words, the information on the resource assignment, which is sent by the base station transceiver apparatus, is taken into account by the relay transceiver apparatus and the relay station apparatus schedules its associated mobile transceivers in line with the information on the resource assignment.

In further embodiments, the apparatus further comprises a transmission unit operable to transmit signals on a plurality of transmission radio resources. The transmission unit may correspond to any means for transmitting, e.g. to a transmitter compliant to one of the above communication systems. The reception unit can be operable to receive on a plurality of reception radio resources and the information on the resource assignment may indicate a restriction of the plurality of transmission radio resources and/or a restriction of the reception radio resources. In other words, the information on the resource assignment may indicate resources which shall or shall not be used by the relay transceiver. In further embodiments the information on the resource assignment may comprise an indication on predefined resource assignments.

In yet another embodiment the relay transceiver apparatus further comprises a timer for determining a predefined time during which transmission or reception radio resources are restricted. The reception unit can be operable to release a restriction of the reception radio resources after the predefined time and/or the transmission unit can be operable to release a restriction of the transmission radio resources after the predefined time. In some embodiments information on the predefined time may be comprised in the information on resource assignment.

In embodiments a radio resource may correspond to a combination of a time and a frequency resource. Embodiments also provide a method for a base station transceiver in a mobile communication network. The mobile communication network comprises the base station transceiver, a mobile transceiver being associated with the base station transceiver and a relay transceiver being associated with the base station transceiver. The method comprises receiving information on a handover request from the mobile transceiver, the information on the handover request indicating that the mobile transceiver is in a situation in which a reception quality of the signals of the relay transceiver would allow a re-association of the mobile transceiver to the relay transceiver. The method further comprises scheduling, subsequent to the reception of the handover request, the mobile transceiver for transmission from the base station transceiver to the mobile transceiver on a radio resource on which transmission of the relay transceiver is suspended.

Embodiments further provide a method for a relay transceiver in a mobile communication network. The mobile communication network comprises a base station transceiver, a mobile transceiver being associated with the relay transceiver, and the relay transceiver being associated with the base station transceiver. The method comprises receiving information on a resource assignment from the base station transceiver and scheduling the mobile transceiver for transmission or reception on a radio resource, which is indicated in the information on the resource assignment.

Embodiments may further provide a computer program having a program code for performing one of the above methods, when the computer program is executed on a computer, processor, or programmable hardware component.

The interference from CSG mobile relays may cause outages to macro mobiles. Furthermore, the macro UL may causes severe interference to in-car connections. Embodiments can provide the advantage that either of these interferences may be reduced or even avoided. Additionally, in-car to in-car interference can be avoided or reduced, which may increase the performance of in-car connections in general.

BRIEF DESCRIPTION OF THE FIGURES

Some other features or aspects will be described using the following non-limiting embodiments of apparatuses and/or methods and/or computer programs by way of example only, and with reference to the accompanying figures, in which.

DESCRIPTION OF SOME EMBODIMENTS

Various embodiments will now be described in more detail with reference to the accompanying drawings. In the figures, the thicknesses of lines, layers and/or regions may be exaggerated for clarity.

Accordingly, while embodiments are capable of various modifications and alternative forms, embodiments thereof are shown by way of example in the figures and will herein be described in detail. It should be understood, however, that there is no intent to limit embodiments to the particular forms disclosed, but on the contrary, embodiments are to cover all modifications, equivalents, and alternatives falling within the scope of the invention. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

In the following, optional components are shown in dashed lines in the Figures.

Figure 1:
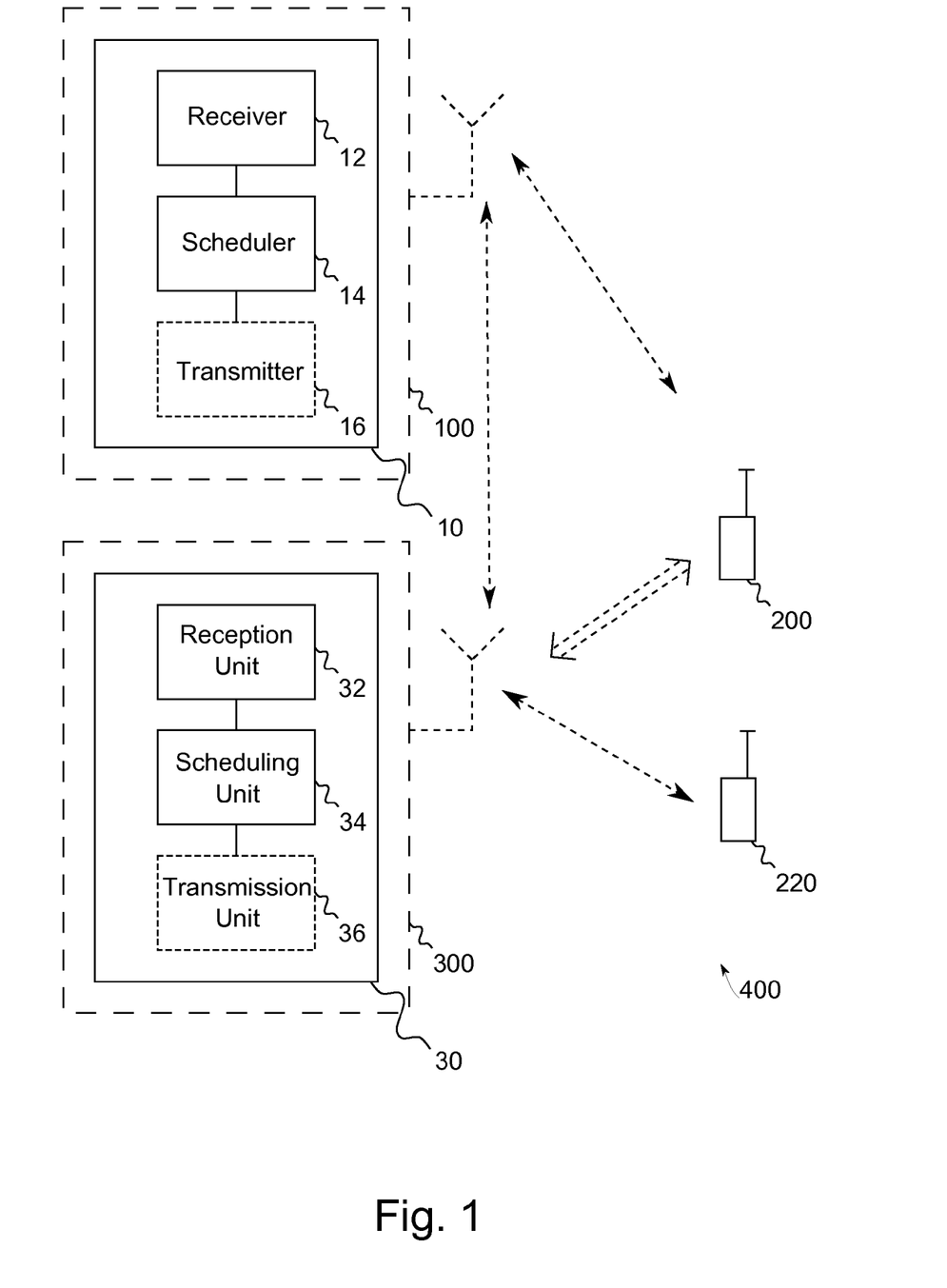
FIG. 1 shows a communication network with an embodiment of a base station transceiver apparatus and an embodiment of a relay transceiver apparatus.

FIG. 1 shows an embodiment of a communication network 400, which is assumed to be an LTE network. FIG. 1 shows an apparatus 10 for a base station transceiver 100 in the mobile communication network 400. The mobile communication network 400 comprises the base station transceiver 100, a mobile transceiver 200, which is associated with the base station transceiver 100 and a relay transceiver 300, which is associated with the base station transceiver 100. The apparatus 10 comprises a receiver 12, which is compliant to the LTE standards in this embodiment, for receiving information on a handover request from the mobile transceiver 200. The information on the handover request indicates that the mobile transceiver 200 is in a situation in which a reception quality of the signals of the relay transceiver 300 would allow a re-association of the mobile transceiver 200 to the relay transceiver 300. The base station transceiver apparatus 10 further comprises a scheduler 14 for scheduling, subsequent to the reception of the handover request, the mobile transceiver 200 for transmission from the base station transceiver 100 to the mobile transceiver 200 on a radio resource on which transmission of the relay transceiver 300 is suspended. The association of the mobile transceiver 200 with the base station transceiver 100 and the relay station 300 with the base station transceiver 100 are shown by the straight dashed arrows. The interference situation between the mobile transceiver 200 and the relay station 300 is indicated by the dashed double-line arrow. In this embodiment, the base station transceiver apparatus 10 further comprises an optional transmitter 16 for transmitting information on a denial of the handover request to the mobile transceiver 200 as response to the information on the handover request.

Moreover, FIG. 1 illustrates an embodiment of an apparatus 30 for the relay transceiver 300 in the mobile communication network 400. The mobile communication network 400 further comprises another mobile transceiver 220 being associated with the relay transceiver 300, which is indicated by the dashed arrow. The relay station apparatus 30 comprises a reception unit 32, which is in this embodiment compliant to the LTE standards or specifications, for receiving information on a resource assignment from the base station transceiver 100. The relay station apparatus 30 further comprises a scheduling unit 34 for scheduling the mobile transceiver 220 for transmission or reception on a radio resource, which is indicated in the information on the resource assignment. In this embodiment the apparatus 30 further comprises an optional transmission unit 36, which is operable to transmit signals on a plurality of transmission radio resources. The reception unit 32 is operable to receive on a plurality of reception radio resources and the information on the resource assignment indicates a restriction of the plurality of transmission radio resources and/or a restriction of the reception radio resources.

Figure 2:
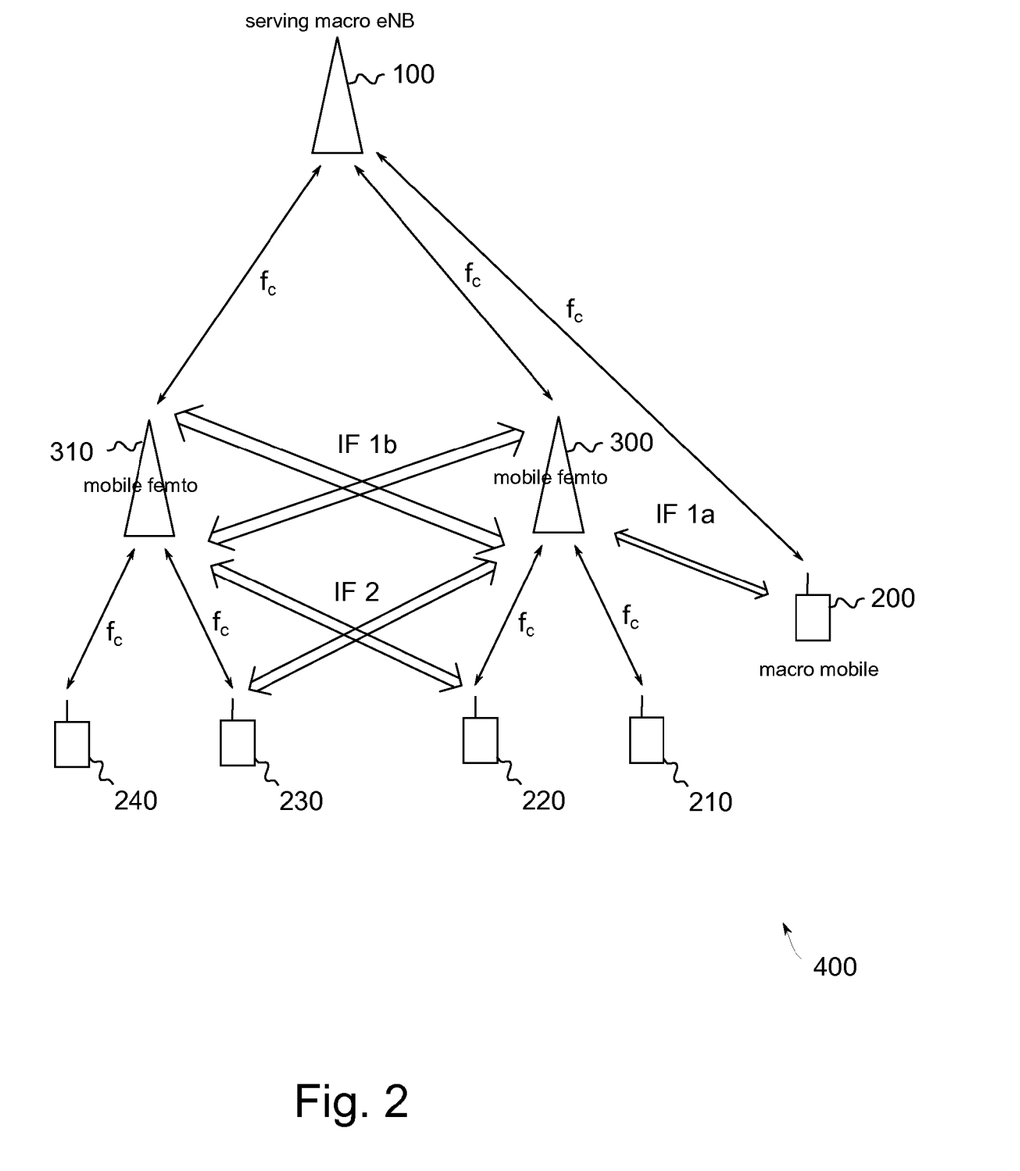
FIG. 2 illustrates a mobile communication network with an embodiment of a base station transceiver and an embodiment of a relay transceiver.

FIG. 2 illustrates another communication network 400 with a serving macro eNodeB (eNB), which corresponds to an embodiment of a base station transceiver 100 comprising a base station transceiver apparatus 10. FIG. 2 further shows a macro mobile 200, which corresponds to the mobile transceiver 200 and which is associated to the serving macro eNB 100. Moreover, FIG. 2 shows two embodiments of relay transceivers 300, 310 which both comprise an embodiment of the relay transceiver apparatus 30 and which are both implemented as mobile femto relay transceivers, for example, establishing femto cells within different cars. In other words the relay stations 300, 310 are mobile and installed in cars and the mobile transceivers associated to the relay transceiver 300, 310 move along with the car and their associated relay transceiver 300, 310. Both of the relay transceivers 300, 310 are associated to the serving macro eNB 100. FIG. 2 illustrates two further mobile transceivers 210, 220, which are associated to the relay transceiver 300, and two mobile transceivers 230, 240, which are associated to relay transceiver 310. Furthermore, the communication network in FIG. 2 is assumed to be a single carrier network, i.e. all components use the same carrier for communicating. Associations are therefore indicated by thin double sided arrows labeled with $f_c$ indicating the carrier frequency. Interference is indicated by double-lined arrows in FIG. 2, the individual interference scenarios will be discussed subsequently.

In the embodiments depicted in FIG. 2 the relay transceivers 300, 310 operate CSGs and FIG. 2 depicts interference types for the CSG mobile relays 300, 310. The network 400 operates at a single carrier frequency $f_c$. IF 1a illustrates interference generated by the macro mobile 200 in the UL, which interferes with the in-car UL and therewith with UL transmission of mobile transceivers 210, 220. Moreover, the mobile relay's 300 DL interferes with the serving macro base station's DL transmission at the macro mobile 200. The in-car DL transmission of the relay transceivers 300, 310 interferes with the serving macro eNB 100 to mobile relay 300, 310 DL transmission, and the mobile relay 300, 310 to serving macro eNB 100 UL transmission interferes with in-car UL transmission, which is labeled by IF 1b in FIG. 2. Furthermore, as indicated by IF 2 in FIG. 2, the in-car UL and DL transmissions of the mobile relay 300 interfere with in-car UL and DL transmission of other mobile relay 310.

The interference between macro and in-car connections (IF type 1a and 1b in FIG. 2) is avoided or reduced by time based interference coordination, by exploiting the fact that a mobile relay 300, 310 in a single carrier system never receives and transmits at the same time, in order to avoid self-reception of transmitted signals. The in-car transmission and reception gaps are used for macro serving eNB 100 to macro mobile 200 transmissions and receptions, respectively.

A mobile relay 300, 310 is scheduled in a time duplex mode, so that it never receives and transmits at the same time, in order to avoid high self interference. The timing is controlled by the macro eNB 100, i.e. the donor eNB 100. Consequently, during a donor eNB 100 to mobile relay 300, 310 DL transmission, there is no DL transmission inside the car and during a mobile relay 300, 310 to donor eNB 100 UL transmission, there is no UL transmission inside the car. Hence, the macro eNB 100 knows, during which sub-frames no UL and DL transmissions, respectively, are performed inside the car.

The macro mobile 200 approaching a mobile relay 300, will send a handover request including the Physical Cell Identification (PCI) of the mobile relay 300 to the macro eNB 100. The macro eNB 100 rejects the request due to the CSG inside the car. Due to this message, the macro eNB 100 is aware that the macro mobile 200 is close to the mobile relay 300 and that the macro mobile 200 and in car transmissions may interfere mutually.

Due to this knowledge, the macro eNB 100 schedules the macro mobile 200 in DL only, when it also schedules (or potentially schedules due to time duplex timing) the mobile relay 300. In this way, the macro eNB 100 can be sure that the in-car mobile 210, 220 is not scheduled in DL and, hence, a high interference towards the macro mobile 200 is avoided.

Furthermore, during a simultaneous UL transmission of macro mobile 200 and in-car mobiles 210, 220 heavy interference is generated to the in-car transmission because the macro mobile 200 is located significantly closer to the mobile relay 300 than to the macro eNB 100 and, hence, due to UL power control, the macro mobile 200 uses a very high UL transmit power compared to the transmit power of the in-car mobiles 210, 220. This type of interference is reduced or avoided by scheduling the close macro mobile 200 for UL transmission only at the same sub-frame, in which the mobile relay 300 is scheduled by the macro eNB 100 or is potentially scheduled in UL due to time duplex timing. During those sub-frames the in-car mobiles 210, 220 do not transmit in UL and, consequently, cannot be interfered.

Hence, in the present embodiment of the base station transceiver 100 and in line with FIG. 1, the scheduler 14 is operable to schedule the mobile transceiver 200 for transmission from the mobile transceiver 200 to the base station transceiver 100 on a radio resource on which reception of the relay transceiver 300 is suspended. In other words, the base station transceiver apparatus 10 at the donor eNB 100 is operable to transmit signals to the relay transceiver 300 using a time resource or sub-frame, which is different from a time resource or sub-frame used to receive signals from the relay transceiver 300. The scheduler 14 is operable to schedule, subsequent to the reception of the handover request, the mobile transceiver 200 for transmission from the base station transceiver 100 to the mobile transceiver 200 on a time resource or sub-frame, which can also be used to transmit signals to the relay station 300. The scheduler 14 is operable to schedule, subsequent to the reception of the handover request, the mobile transceiver 200 for transmission from the mobile transceiver 200 to the base station transceiver 100 on a time resource or sub-frame used to receive signals from the relay station 300.

In a dedicated carrier network, i.e. using one carrier for the macro network and one different carrier for the in-car network, in-car transmissions and macro transmissions do not mutually interfere and time duplex may not be necessary for connections from donor eNB 100 to mobile relay 300, 310 and for in-car transmissions.

However, the in-car parts of two mobile relays 300, 310 still mutually interfere with each other in case the two corresponding cars are closely located. In the present embodiment this is reduced or avoided, e.g., by dividing the in-car bandwidth into disjunctive parts. For example, the mobile relay 300 recognizes that another mobile relay 310 is close when an in-car mobile 220 requests a handover to the other mobile relay 310. The handover request includes the PCI of the other mobile relay 310. Due to the missing X2 interface, i.e. a direct communication, between the mobile relays 300, 310, the request is conveyed to the corresponding macro eNB 100, which recognizes that the target eNB 310 is a mobile relay 310 and forms a CSG. The macro eNB 100 requests a split of the bandwidth of both mobile relays 300, 310 into two disjunctive parts.

The mutual interference between in-car connections of two different mobile relays 300, 310 (IF type 2 in FIG. 2) is avoided by recognizing the interference situation, i.e. by recognizing that the two mobile relays 300, 310 are temporarily closely located, and by, e.g., splitting the bandwidth available for in-car connections into two disjunctive parts.

Hence, in the present embodiment, the receiver 12 is operable to receive information on a handover request from another mobile transceiver 220, which is associated to the relay transceiver 300. The receiver 12 is operable to determine whether the information on the handover request comprises an indication that the other mobile transceiver 220 is in a situation in which a reception quality of the signals of another relay transceiver 310 would allow a re-association of the other mobile transceiver 220 to the other relay transceiver 310. The transmitter 16 is operable to transmit information on a resource assignment to the relay transceiver 300 and for transmitting information on a resource assignment to the other relay transceiver 310 such that the relay transceiver 300 and the other relay transceiver 310 use different radio resources for communicating with mobile transceivers 210, 220 associated to the relay transceiver 300 and for communicating with mobile transceivers 230, 240 associated to the other relay transceiver 310. The relay transceiver apparatus 30 is then operable to take the resource assignment into account in line with the above description of FIG. 1.

The information on the resource assignments can be such that a bandwidth is split in a first disjunctive part, which is assigned to the relay transceiver 300 and a second disjunctive part, which is assigned to the other relay transceiver 310. The information on the resource assignment can indicate a restriction of the plurality of transmission radio resources and/or a restriction of the reception radio resources. The information on the resource assignments can be such that a plurality of radio resources is subdivided in two disjunctive groups of combinations of time and frequency resources, where one group is assigned to the relay transceiver 300 and another group is assigned to the other relay transceiver 310. That is to say each of the disjunctive groups may comprise a combination of sub-bands and symbols, in some embodiments the groups may comprise different Physical Resource Blocks (PRBs) in line with the LTE specifications. In some embodiments, the available bandwidth can be subdivided into two sub-bands, which correspond to the two disjunctive groups. The two relay transceivers 300, 310 may then use the two sub-bands as two adjacent carriers, for example, each comprising half of the total number of PRBs.

In the unlikely case that the number of in-car resources does not meet the requirements of the in-car mobiles 210, 220, the mobile relay 300 may increase the in-car bandwidth after a predefined waiting time. The apparatus 30 may then further comprise a timer for determining a predefined time during which transmission or reception radio resources are restricted. The reception unit 32 is then operable to release a restriction of the reception radio resources after the predefined time and/or the transmission unit 36 is then operable to release a restriction of the transmission radio resources after the predefined time.

In an alternative embodiment, the bandwidth is not divided, but the corresponding resources are either not used or reduced in power, i.e. the maximum transmission power on these resources may be restricted.

Figure 3:
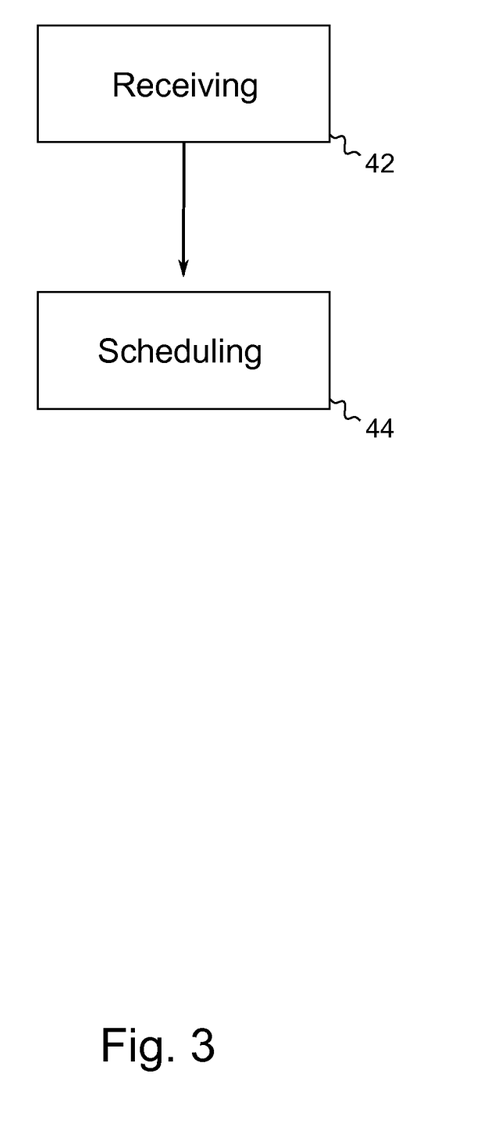
FIG. 3 shows a block diagram of an embodiment of a method for a base station transceiver.

FIG. 3 shows a block diagram of an embodiment of a method for a base station transceiver 100 in a mobile communication network 400. The mobile communication network 400 comprises the base station transceiver 100, a mobile transceiver 200 being associated with the base station transceiver 100 and a relay transceiver 300 being associated with the base station transceiver 100. The method comprises a step of receiving 42 information on a handover request from the mobile transceiver 200, the information on the handover request indicating that the mobile transceiver 200 is in a situation in which a reception quality of the signals of the relay transceiver 300 would allow a re-association of the mobile transceiver 200 to the relay transceiver 300. The method comprises a further step of scheduling 44, subsequent to the reception of the handover request, the mobile transceiver 200 for transmission from the base station transceiver 100 to the mobile transceiver 200 on a radio resource on which transmission of the relay transceiver 300 is suspended.

Figure 4:
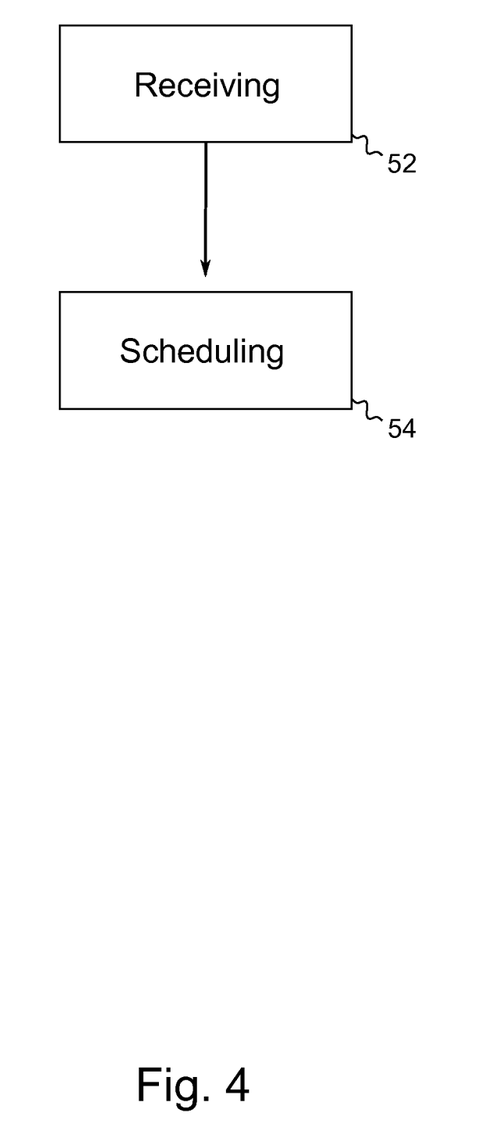
FIG. 4 shows a block diagram of an embodiment of a method for a relay station transceiver.

FIG. 4 shows a block diagram of an embodiment of a method for a relay station transceiver 300 in a mobile communication network 400. The mobile communication network 400 comprises a base station transceiver 100, a mobile transceiver 220 being associated with the relay transceiver 300 and the relay transceiver 300 being associated with the base station transceiver 100. The method comprises a step of receiving 52 information on a resource assignment from the base station transceiver 100 and a step of scheduling 54 the mobile transceiver 220 for transmission or reception on a radio resource which is indicated in the information on the resource assignment.

Embodiments may further provide a computer program having a program code for performing one of the above methods, when the computer program is executed on a computer or processor.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as magnetic disks and magnetic tapes, hard drives, or optically readable digital data storage media. The embodiments are also intended to cover computers programmed to perform said steps of the above-described methods or (field) programmable logic arrays ((F)PLAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing or to perform a certain function, respectively. Hence, a "means for s.th." may as well be understood as a "means being adapted or suited for s.th.". A means being adapted for performing a certain function does, hence, not imply that such means necessarily is performing said function (at a given time instant).

The functions of the various elements shown in the Figures, including any functional blocks labeled as "means", "means for receiving", "means for scheduling", "means for transmitting", etc., may be provided through the use of dedicated hardware, such as "a receiver", "a scheduler" "a transmitter", etc. as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. An apparatus for a base station transceiver in a mobile communication network, the mobile communication network comprising the base station transceiver, a mobile transceiver being associated with the base station transceiver and a relay transceiver being associated with the base station transceiver, the relay transceiver having a radio resource on which transmission of the relay transceiver is suspended, the apparatus comprising:
   a receiver for receiving information on a handover request from the mobile transceiver, the information on the handover request indicating that the mobile transceiver is in a situation in which a reception quality of the signals of the relay transceiver would allow a re-association of the mobile transceiver to the relay transceiver, the re-association of the mobile transceiver to the relay transceiver being denied; and
   a scheduler for scheduling, subsequent to the reception of the handover request, the mobile transceiver for transmission from the base station transceiver to the mobile transceiver on the radio resource on which transmission of the relay transceiver is suspended.

2. The apparatus of claim 1, further comprising a transmitter for transmitting information on a denial of the handover request to the mobile transceiver as response to the information on the handover request.

3. The apparatus of claim 1, wherein the scheduler is operable to schedule the mobile transceiver for transmission from the mobile transceiver to the base station transceiver on a radio resource on which reception of the relay transceiver is suspended.

4. The apparatus of claim 1, wherein the apparatus further comprises a transmitter and wherein the apparatus is operable to transmit signals to the relay transceiver using a time resource which is different from a time resource used to receive signals from the relay transceiver, wherein the scheduler is operable to schedule, subsequent to the reception of the handover request, the mobile transceiver for transmission from the base station transceiver to the mobile transceiver on a time resource used to transmit signals to the relay station.

5. The apparatus of claim 1, wherein the apparatus further comprises a transmitter and wherein the apparatus is operable to transmit signals to the relay transceiver using a time resource which is different from a time resource used to receive signals from the relay station, wherein the scheduler is operable to schedule, subsequent to the reception of the handover request, the mobile transceiver for transmission from the mobile transceiver to the base station transceiver on a time resource used to receive signals from the relay station.

6. The apparatus of claim 1, wherein the relay transceiver is mobile and installed in a vehicle and wherein there is at least one other mobile transceiver moving with the vehicle and associated with the relay transceiver.

7. The apparatus of claim 1, wherein the receiver is operable to receive information on a handover request from another mobile transceiver, which is associated to the relay transceiver, wherein the receiver is operable to determine whether the information on the handover request comprises an indication that the other mobile transceiver is in a situation in which a reception quality of the signals of another relay transceiver would allow a re-association of the other mobile transceiver to the other relay transceiver, and wherein the apparatus further comprises a transmitter for transmitting information on a resource assignment to the relay transceiver and for transmitting information on a resource assignment to the other relay transceiver such that the relay transceiver and the other relay transceiver use different radio resources for communicating with mobile transceivers associated to the relay transceiver and the other relay transceiver.

8. The apparatus of claim 7, wherein the information on the resource assignments is such that a bandwidth is split in a first disjunctive part, which is assigned to the relay transceiver and a second disjunctive part, which is assigned to the other relay transceiver.

9. The apparatus of claim 7, wherein the information on the resource assignments is such that a plurality of radio resources is subdivided in two disjunctive groups of combinations of time and frequency resources, where one group is assigned to the relay transceiver and another group is assigned to the other relay transceiver.

10. An apparatus for a relay transceiver in a mobile communication network, the mobile communication network comprising a base station transceiver, a mobile transceiver being associated with the relay transceiver and the relay transceiver being associated with the base station transceiver, the apparatus comprising:
   a reception unit for receiving information on a resource assignment from the base station transceiver;
   a scheduling unit for scheduling the mobile transceiver for transmission or reception on a radio resource which is indicated in the information on the resource assignment, wherein the reception unit is operable to receive on a plurality of reception radio resources and wherein the information on the resource assignment indicates a restriction of the plurality of the reception radio resources;
   a transmission unit operable to transmit signals on a plurality of transmission radio resources and, wherein the information on the resource assignment indicates a restriction of the plurality of transmission radio resources; and
   a timer for determining a predefined time during which transmission or reception radio resources are restricted, wherein the reception unit is operable to release a restriction of the reception radio resources after the predefined time and/or wherein the transmission unit is operable to release a restriction of the transmission radio resources after the predefined time.

11. A method for a base station transceiver in a mobile communication network, the mobile communication network comprising the base station transceiver, a mobile transceiver being associated with the base station transceiver and a relay transceiver being associated with the base station transceiver, the relay transceiver having a radio resource on which transmission of the relay transceiver is suspended, the method comprising:
   receiving information on a handover request from the mobile transceiver, the information on the handover request indicating that the mobile transceiver is in a situation in which a reception quality of the signals of the relay transceiver would allow a re-association of the mobile transceiver to the relay transceiver, the re-association of the mobile transceiver to the relay transceiver being denied; and
   scheduling, subsequent to the reception of the handover request, the mobile transceiver for transmission from the base station transceiver to the mobile transceiver on the radio resource on which transmission of the relay transceiver is suspended.

12. A computer program having a program code for performing the method of claim 11, when the computer program is executed on a computer or processor.

* * * * *